US008656297B2

(12) United States Patent
Koenig et al.

(10) Patent No.: US 8,656,297 B2
(45) Date of Patent: Feb. 18, 2014

(54) ENHANCED VIRTUALIZATION SYSTEM

(75) Inventors: Michael F. Koenig, Bellevue, WA (US); Ira L. Snyder, Bellevue, WA (US); Neil S. Fishman, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 460 days.

(21) Appl. No.: 12/751,756

(22) Filed: Mar. 31, 2010

(65) Prior Publication Data
US 2011/0246922 A1 Oct. 6, 2011

(51) Int. Cl.
*G06F 9/46* (2006.01)
*G06F 3/048* (2013.01)
*G06F 15/173* (2006.01)

(52) U.S. Cl.
USPC .......................................... 715/771; 715/733

(58) Field of Classification Search
USPC .................................. 715/771, 733
See application file for complete search history.

(56) References Cited

U.S. PATENT DOCUMENTS

| | | | |
|---|---|---|---|
| 6,848,106 B1 | 1/2005 | Hipp | |
| 7,620,894 B1* | 11/2009 | Kahn | 715/707 |
| 2003/0182358 A1 | 9/2003 | Rowley et al. | |
| 2005/0108709 A1 | 5/2005 | Sciandra et al. | |
| 2006/0041927 A1* | 2/2006 | Stark et al. | 725/139 |
| 2007/0260702 A1 | 11/2007 | Richardson et al. | |
| 2009/0007100 A1 | 1/2009 | Field et al. | |
| 2009/0125902 A1 | 5/2009 | Ghosh et al. | |
| 2010/0064239 A1* | 3/2010 | Crawford et al. | 715/771 |
| 2010/0131607 A1* | 5/2010 | Firminger et al. | 709/206 |
| 2010/0153548 A1* | 6/2010 | Wang et al. | 709/224 |
| 2011/0314124 A1* | 12/2011 | Gimson | 709/217 |

OTHER PUBLICATIONS

Larson, Carbone, "Windows Server 2008 Hyper-V Resource Kit", retrieved on Jan. 19, 2010 at <<http://www.virtualizationadmin.com/upl/documents/WindowsServer2008-Hyper-V-ResourceKit-CH02.pdf>>, Microsoft Press, Solid Quality Mentors, 2009, pp. 26-68.
"Microsoft Virtual Desktop Infrastructure (VDI) FAQ", retrieved on Jan. 19, 2010 at <<http://download.microsoft.com/download/2/E/3/2E303AAA-4217-4E67-9ABC-B7FEADC86640/VECD%20VDI%20FAQ%20dec2008.pdf>>, Microsoft Corporation, Dec. 17, 2008, pp. 1-6.
Plank, Beck, Kingsley, Ki, "Libckpt: Transparent Checkpointing under Unix", retrieved on Jan. 19, 2010 at <<http://www.usenix.org/publications/library/proceedings/neworl/full_papers/plank.ps>>, Usenix Winter Technical Conference, Jan. 1995, pp. 213-223.
"Using the Remote Desktop Virtualization API", retrieved on Jan. 19, 2010 at <<http://msdn.microsoft.com/en-us/library/ee351750(VS.85).aspx>>, Microsoft Corporation, 2010, pp. 1.

* cited by examiner

*Primary Examiner* — Andrea Leggett
(74) *Attorney, Agent, or Firm* — Holly Nguyen; David Andrews; Micky Minhas

(57) ABSTRACT

A computing device creates lightweight state files. The state files may include information relating to user processes, user-interface elements, and time points. When loaded, the state files restore the saved state. State files may be transferred to different computing devices thus making a computer state portable. A series of state files viewed as a stream showing changes in the system state over time.

20 Claims, 6 Drawing Sheets

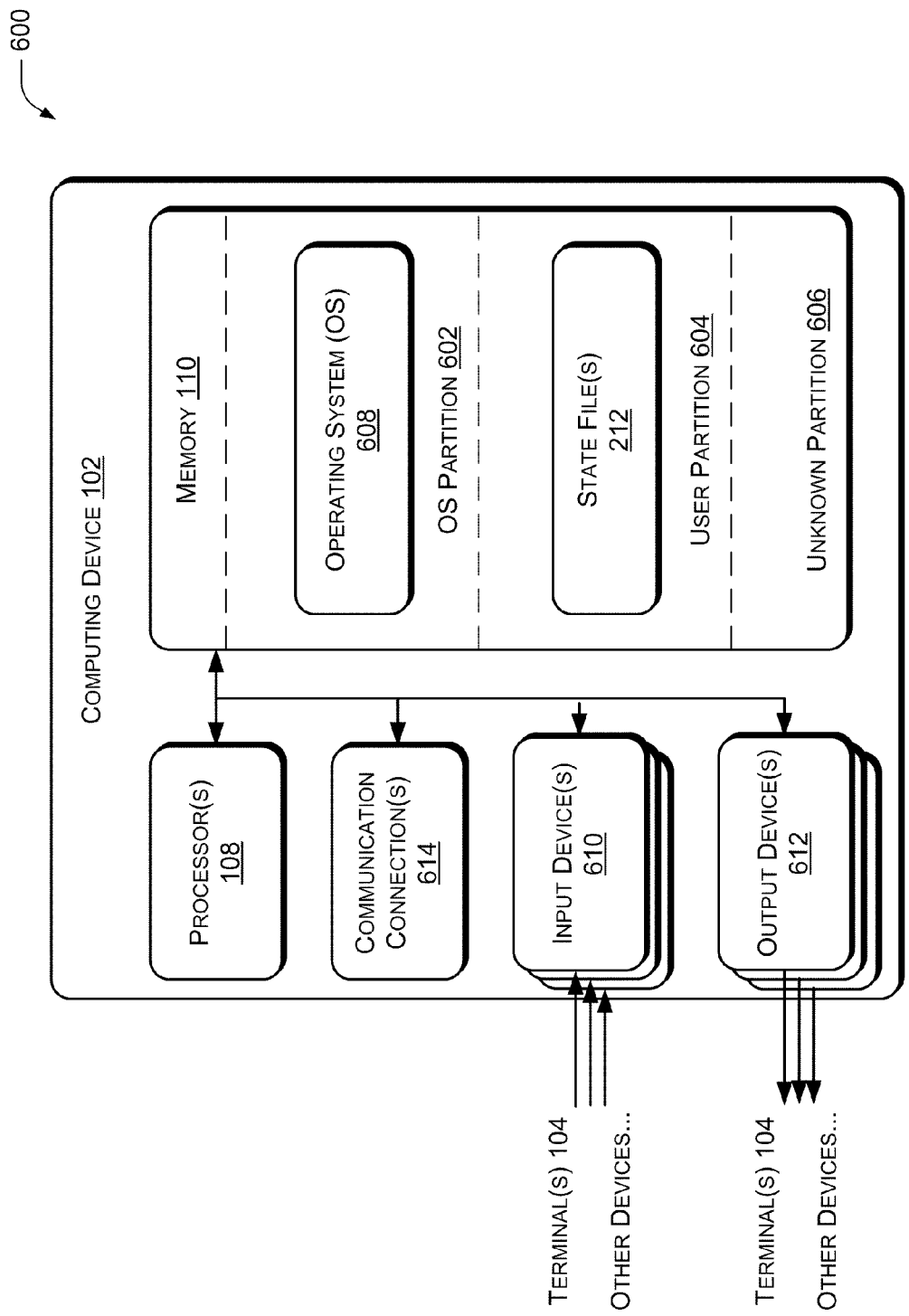

ENHANCED VIRTUALIZATION SYSTEM

BACKGROUND

Computer use is becoming increasingly decoupled from any particular computing device. Users may view their computing experience as defined more by access to data and available software applications than by the type of computer they are using. A user can write a report on a desktop computer at work, check e-mail on a smart phone, and complete the report at home using a notebook computer. In this scenario, access to an e-mail account and the ability to work on the report may be more important to the user than the particular device used.

Computing devices are also becoming increasingly shared rather than used exclusively by a single user. Instead of having a stand-alone desktop computer, a user may work on a terminal that is little more than a monitor and a keyboard with a connection to a central server or other shared computing device. In these types of shared resource scenarios the central server may simultaneously support multiple users. Thus, a single user may work on multiple machines and a single machine may support multiple users.

One way for a user to interact with many different computing devices is by establishing a Remote Desktop session with another computing device. By remotely accessing one computer (e.g., a desktop computer at work) from another computer (e.g., the notebook computer at home) the user can continue with the computing experience begun on the desktop computer. However, Remote Desktop sessions require that both computers are running and that both computers are connected to the same network (e.g., the Internet). Remote Desktop sessions cannot preserve the state of a computer system through reboots of the computer. Remote Desktop sessions also do not allow people to be isolated from each other on the computer so multiple users cannot simultaneously share the processing power and memory of a single computer.

In another context, multiple users are able to share a single hardware host with a hypervisor, also called a virtual machine manager. A hypervisor may be used to share a host computer's processor, memory, and other resources amongst multiple users such as users on terminal devices or thin clients. However, maintaining multiple guest operating systems (called virtual machines) can consume significant amounts of processor and memory resources. The hypervisor itself may be a very large software file making it unwieldy to transfer between computing devices. Also, since hypervisors typically introduce another layer between the hardware and the user-interface layer, hypervisors may take a long time to load at system startup.

The shift away from a one-to-one correspondence between user and computer is not adequately addressed by these and other prior techniques for managing computing experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject of this disclosure is directed to an enhanced virtualization system that provides lightweight state isolation, the ability to save and restore a saved state, and the ability to manage multiple state streams. The system may be implemented in a Shared Resource Computing (SRC) environment in which multiple users share computing resources. The system is also applicable for a single user desiring to take his or her computing experience to multiple different computing devices.

In one implementation, a system that includes a process filter separates operating system (OS) processes from user processes. The system may also include a user-interface recorder that records user-interface elements as perceived by the user. As the user processes and the user-interface elements change over time, a clock may correlate the user processes for a given time point with the user-interface elements for that same time point. A file writer in the system may create a state file from the user processes, the user-interface elements, and the time point. The state file may be loaded, for example on a different computing device, to re-create the saved state.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 6 is a block diagram of an illustrative computing device.

DETAILED DESCRIPTION

The disclosure describes a computing experience that compliance aspects of both hypervisors and Remote Desktops into a solution that provides light weight Remote Desktop style access, with the ability to load a saved state. By saving the "state" of a computing experience, everything that a user is interacting with (e.g., files, applications, windows, web pages, etc.) is maintained in a state that allows the user to return to a previously saved state similar to the way notebook computer wakes from a hibernation state. The state file can be loaded by an operating system (OS) and the OS is able to place a computing device into the state stored in the state file. The state file can restore a computing device to the previously saved state or the state file can be used to transfer the state to a different computing device.

Illustrative System Including Terminals and a Computing Device

Figure 1:
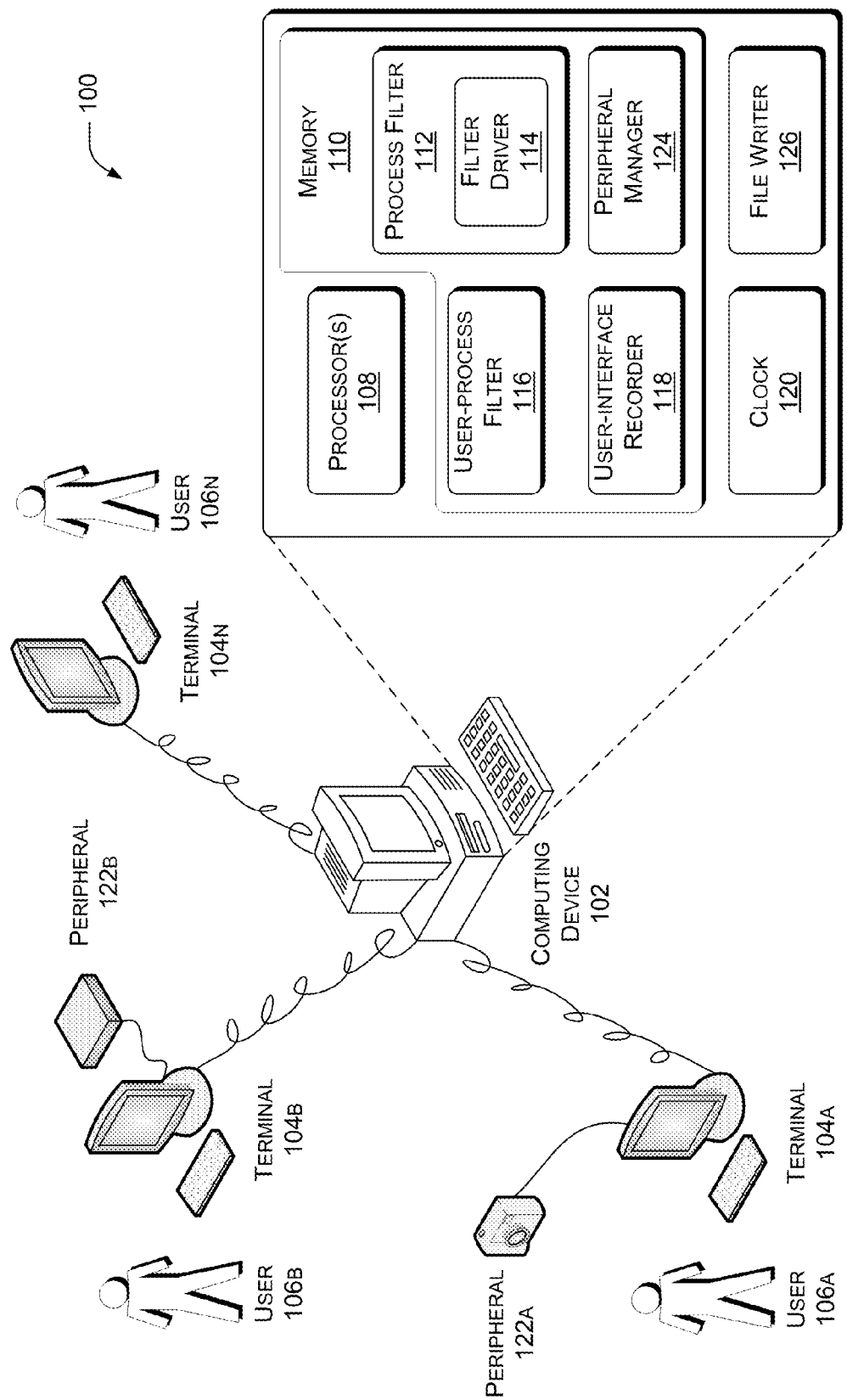
FIG. 1 is a schematic diagram of an illustrative system including multiple terminals and a central computing device configured to create a state file.

FIG. 1 shows an architecture 100 of a system with a computing device 102 and a plurality of terminals 104A-104N. The computing device 102 may be a conventional desktop or laptop computer, a Web server, a set-top box, a gaming console, a cell phone, a personal digital assistant, or the like. The plurality of terminals 104A-104N may obtain processor resources at least in part from the processor(s) 108 of the computing device 102 and obtain memory resources at least in part from the memory 110 of the computing device 102. The terminals 104 may comprise input and output devices without separate processors or memory. In other implementations, the terminals 104 may be thin clients with limited processors and/or memory. Each user terminal 104 provides input and output devices (e.g., a keyboard and a monitor) for a respective user 106A-106N.

Although illustrated in a Shared Resource Computing (SRC) implementation, the elements and functionality of the computing device 102 discussed herein are equally applicable to a system in which the computing device 102 is not sharing resources with terminals 104 (e.g., a desktop computer). Similarly, the discussion contained in this disclosure is applicable to distributed or cloud computing systems in which a session may, for example, on within a virtual machine on a server in the cloud. A user (not shown) may interact directly with the input and output devices of the computing device 102 in either the SRC, stand-alone, and/or distributed computing implementations.

The computing device 102 includes one or more processors 108 one or more memories 110. The computing device 102 may also include a process filter 112 configured to separate operating system (OS) processes from user processes. In some implementations, the process filter 112 may be implemented as a filter driver 114. When the computing device 102 is shared by multiple users, such as users 106A-106N, there may be multiple sets of user processes (i.e., one for each user 106A-106N). The computing device 102 may be further configured with a user-process filter 116 to separate user processes of a first user (e.g., user 106A) from user processes of a second user (e.g., user 106B).

Processes, the actual execution of computer program instructions, are executed by the processor 108 and exist, at least temporarily, in the memory 110. However, processes are generally not directly perceived by the user. The processes created by an OS or an application may cause the computing device 102 to output a user interface that is directly perceived by the user. The user interface may include graphical elements such as "windows," audio elements like a "click" sound, and even tactile elements for example the vibration of a game controller. The totality of outputs that the user perceives are all user-interface elements. The user-interface elements may include identity of windows (e.g., a window for a word processing application), location of windows (e.g., position on a monitor and dimensions of the window measured in pixels or the like), content displayed within a window (e.g., paragraphs 1-3 of a word processing document), and the like. A user-interface recorder 118 in the computing device 102 may record these user-interface elements as presented to the user.

At any given time point during a computing session there are both processes running and user-interface elements presented to the user. Capturing the state of the computing device 102, or of the session presented on one of the terminals 104A-104N, includes capturing process information as well as user-interface information. A clock 120 may be configured to correlate the user processes for a time point with the user-interface elements for that same time point. The correlation may be implemented by marking the user processes and/or the user-interface elements with one or more timestamps. Correlation may keep the user-interface elements in phase with the underlying processes. The clock 120 may be a system clock within the computing device 102 or another temporal correlation device that lacks some features of a standard clock but is capable of correlating processes with user-interface elements.

Some or all of the terminals 104A-104N may have peripheral devices. For example, a first terminal 104A may have a digital camera coupled to it as a peripheral 122A. A second terminal 104B may be coupled to a different peripheral 122B such as an external hard drive. In the SRC implementation, the respective peripherals 122A and 122B may both be managed by an OS running on the computing device 102. Accordingly, processes related to the two peripheral devices 122A and 122B may potentially be co-mingled in the processor(s) 108 and the memory 110 of the computing device 102. In order to keep track of the peripherals 122 and users 106, the computing device 102 may include a peripheral manager 124 configured to associate a peripheral device with a first user 106 and/or terminal 104 (e.g. peripheral 122A with user 106A and/or terminal 104A) or with a second user (e.g. peripheral 122A with user 106B and/or terminal 104B). The peripheral manager 124 allows for more sophisticated management of peripheral devices 122 and association of peripheral devices with a user 106 and/or a session as opposed to other virtualization systems (e.g., virtual machines) that may block access to peripheral devices 122 altogether.

The state of the computing experience is saved to a file by a file writer 126. The file writer 126 creates a state file that may comprise data which corresponds to the user processes, the user-interface elements, the time point, the peripherals, and/or the like. The file writer 126 may be further configured to create separate state files for each of the users 106A-106N of the computing device 102. Creation of the state file allows for saving and moving of a computing experience as well as the creation of state streams that represent changes in both processes and user-interface elements that occurred during a computing session. Both state files and state streams will be discussed below in greater detail.

Illustrative State File

Figure 2:
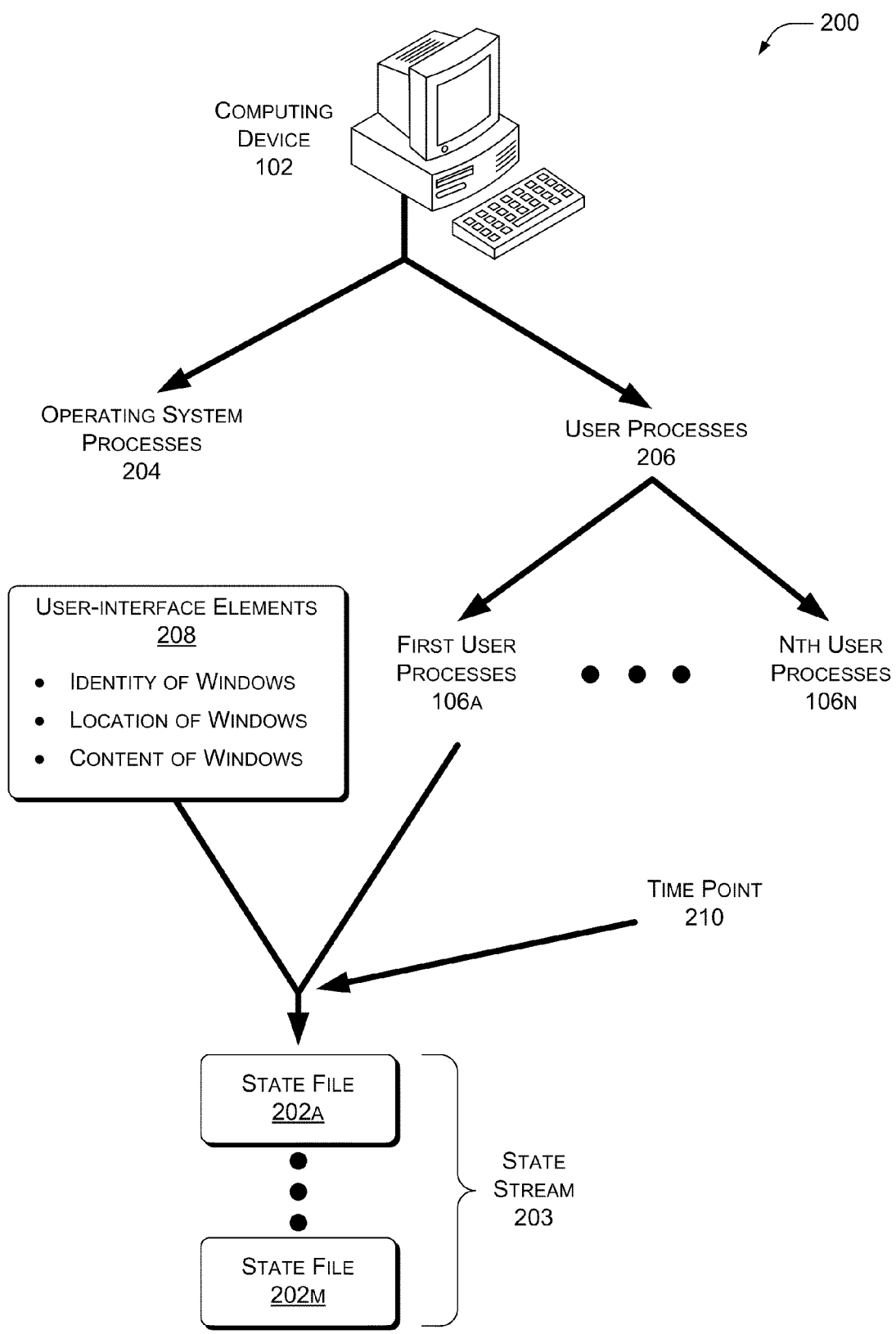
FIG. 2 is a schematic diagram showing data filtering and aggregation paths related to creating the state file.

FIG. 2 shows a schematic diagram 200 of data used to generate one or more state files 202a-202m. Saving the state file 202 creates a "snapshot" of the system state rather than just saving individual application files. This snapshot includes the applications opened, the location of those application on the screen, the data inside each application, and the like. Multiple snapshots can create a state stream 203 or flow of changes to the system state analogous to how multiple still images can create a movie. The processes running on computing device 102 are separated into OS processes 204 and user processes 206. The OS processes 204 may be separated from the user processes 206 by the process filter 112 and/or the filter driver 114. In some implementations, the process filter 112 may place a marker in the OS load chain indicating that processes loaded after the marker are user processes. The process filter 112 may identify all processes designated as network processes, OS processes, display drivers, input/output device drivers, and/or services used exclusively by the OS as OS processes 204. The process filter 112 may also differentiate between operating system processes 204 and user processes 206 by isolating memory write locations and/or isolating service calls made by applications. Separating the user processes 206 creates a smaller and lighter weight file for portability as well as minimizes potential conflicts if the state file 202 is used on a different computing device. Creating a state file 202 without the OS processes 204 enables the state to be loaded on machines of different hardware configurations, as well as different base application and OS settings. For example, if the state file 202 contained hardware processes, then those processes may cause errors or exceptions if restarted on a different machine with a different hardware configuration. However, many applications and associated user processes run at a higher level meaning that a specific hardware configuration does not change the data present in the memory when those processes are running. For example, the software code for Microsoft Word® can create the same application and user experience running on top of many different hardware configurations. Thus, the state file 202 is a hardware-independent or hardware-neutral snapshot of the system state. For example, a state file 202 created on a computing device with an Intel® processor can reconstitute the state on a different computing device with an AMD® processor.

If the computing device 102 is used simultaneously by multiple users, such as in a SRC environment, there may be privacy and security concerns if all user processes 206 are put into every state file 202. In order to prevent state residue bleeding from one user to another, the user-process filter 116 may separate the user processes 206 by placing the processes for a first user (e.g., user 106A) into a different file than the processes for a second, third, fourth, or Nth user (e.g., user 106N). This diagram 200 shows only the creation of a state file 202 for one user 106A for the sake of clarity, even though separate state files 202 may be created for each user 106A-106N.

The state file 202 includes information related to user-interface elements 208. As discussed above, the user-interface elements 208 include the identity of windows, the location of windows, and the content of windows among other things. This allows the state file 202 to preserve the system exactly as it looked when the user created the state file 202. Other user-interface elements 208 may also be preserved such as, for example audio output. The state file 202 may also included a time point 210 that correlates the user processes 206 with the user-interface elements 208. The time point 210 may be used to order state files 202 chronologically so that changes in the state can be tracked over time. The change of state over time as represented by multiple state files 202a-202m or a "state stream" 203 will be discussed in greater detail below.

Illustrative User Interface

Figure 3:
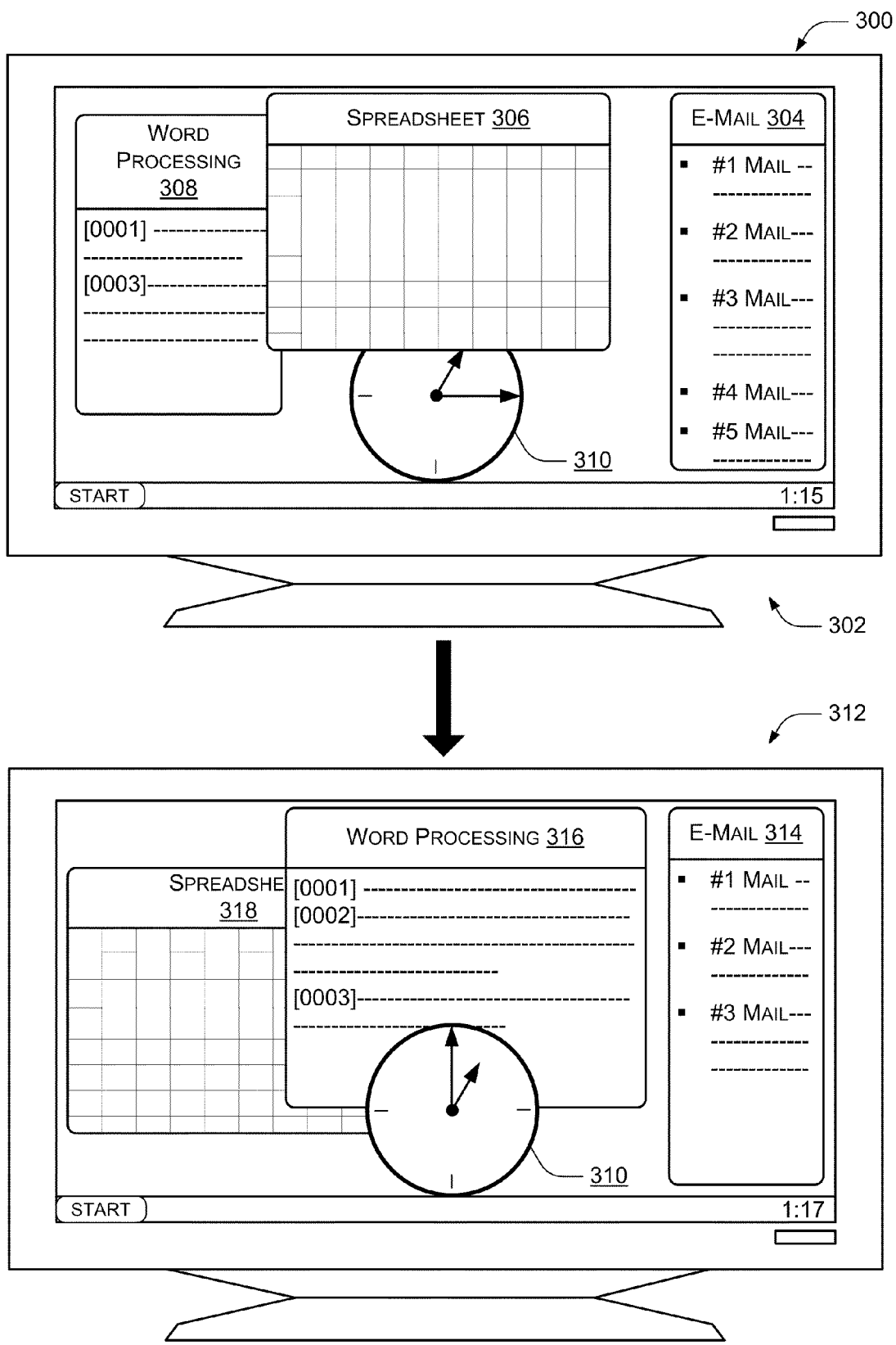
FIG. 3 is user interface representation showing user-interface elements at two different time points.

FIG. 3 shows an illustrative user interface 300 at different points along a state stream 203. The user interface 302 shows the system state as viewed by the user at the first time point, for example at 1:15 PM. In this user interface 302 the user is looking at three windows: a window corresponding to an e-mail application 304, a window corresponding to a spreadsheet application 306 and a window corresponding to a word processing application 308. Creation of a state file 202 at this point will save each of the three windows, the position of the windows on the screen, and the content displayed within the windows. The user interface 302 may also include a graphical indicator 310 of the time point within a state stream 203. The graphical indicator may be a clock, a slider bar, or the like. In user interface 302, the graphical indicator 310 indicates that the displayed state is the state as it existed at 1:15 PM. By selecting a different time, for example moving the hands on the clock 310, the user may return to the previous state in order to retrieve a lost file, see a document as it existed before editing, restore a deleted e-mail, or the like. Since the application state of the active applications are preserved in the state file 202 rolling back "time" on the graphical indicator 310 can present a view of the user's computer exactly as it appeared at that previous time point.

User interface 312 shows the system state as it existed 15 minutes earlier at 1:00 PM. Of course, the true time has not reversed so the system time will not go backwards, but the graphical indicator 310 will show the time at which the currently displayed system state existed. This time shown on the graphical indicator 210 (e.g., 1:00 PM) may be derived in part from the time point 210 included in the state file 202. The e-mail application 314 at this earlier time point shows only three e-mail messages and does not show the two e-mail messages (i.e., #4 Mail and #5 Mail) which arrived between 1:00 PM and 1:15 PM. The word processing application 316 was, at this earlier time point, in the center of the display and the window was showing paragraphs 0001, 0002, and 0003 of a word processing document. At the 1:15 PM time point the word processing document 308 no longer included paragraph 0002. If, for example, the user realized he or she did not want to delete paragraph 0002, but had not saved an earlier version of the word processing document, he or she could rollback the state to retrieve paragraph 0002. The spreadsheet application 318 window is behind the word processing application 316 window and the spreadsheet application 318 is not the active window at the 1:00 PM time point. When changing from the state as it existed at 1:15 PM time point back to the state as it existed at the 1:00 PM time point the spreadsheet 318 is also reverted to the state it was in 15 minutes prior. Changing all the applications together as the state is rolled back to an earlier time point provides context that is absent from viewing earlier versions of files in isolation from one another.

For example, if the second time point was not 15 minutes but rather 15 days earlier the user may not member why he or she wrote paragraph 0002. Viewing the spreadsheet 318 application, particularly since the state file 202 stores the portion of the spreadsheet which was displayed in the window (e.g., which cells are currently in view), it may remind the user why he or she wrote paragraph 0002.

The previous states may be viewed like a movie, without interactivity, by rolling the "time" backwards and forwards using the graphical indicator 310. In some implementations, the user may be able to select an earlier time point and indicate "play" or a similar command and the computing device will show the movement of windows, the change of content in the windows, and the like as it occurred in the past. Viewing the state stream 203 like a movie and being able to rewind, fast forward, pause, and play state information allows, for example, the user working on a presentation to go backwards and "time" and play back the states over time from morning up until afternoon when he or she made a major edit to the presentation. This can be used to review the development process of the presentation and, since the state file 202 is portable, the entire development process, not just a finished document, can be shared with others.

As a further example, being able to save and replay the arrangement of application windows, the timing of which windows are opened when, and the particular content displayed within each window may have particular utility for presentations. Some users may desire to show data from web pages and spreadsheets as well as from presentation software. Saving a presentation or slideshow file alone does not necessarily save the whole "presentation." However, by saving the state of the system the user can draw from multiple different software applications to create a presentation that uses presentation software, web pages, and/or other applications and files.

If the user wishes to interact with the state shown in user interface 312 this may create a different timeline or a "fork" in the state stream 203. The user can change edits to the word processing document 316 to create something different than he or she ended up with originally in the word processing document 308 shown in the user interface 302. This forward progress along a different path creates another state stream 203 that is captured by different state files 202.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that can be implemented in hardware, software, or a combination of hardware and software. For discussion purposes, the processes are described with reference to the system shown in FIGS. 1-3. However, the processes may be performed using different architectures and devices.

Figure 4:
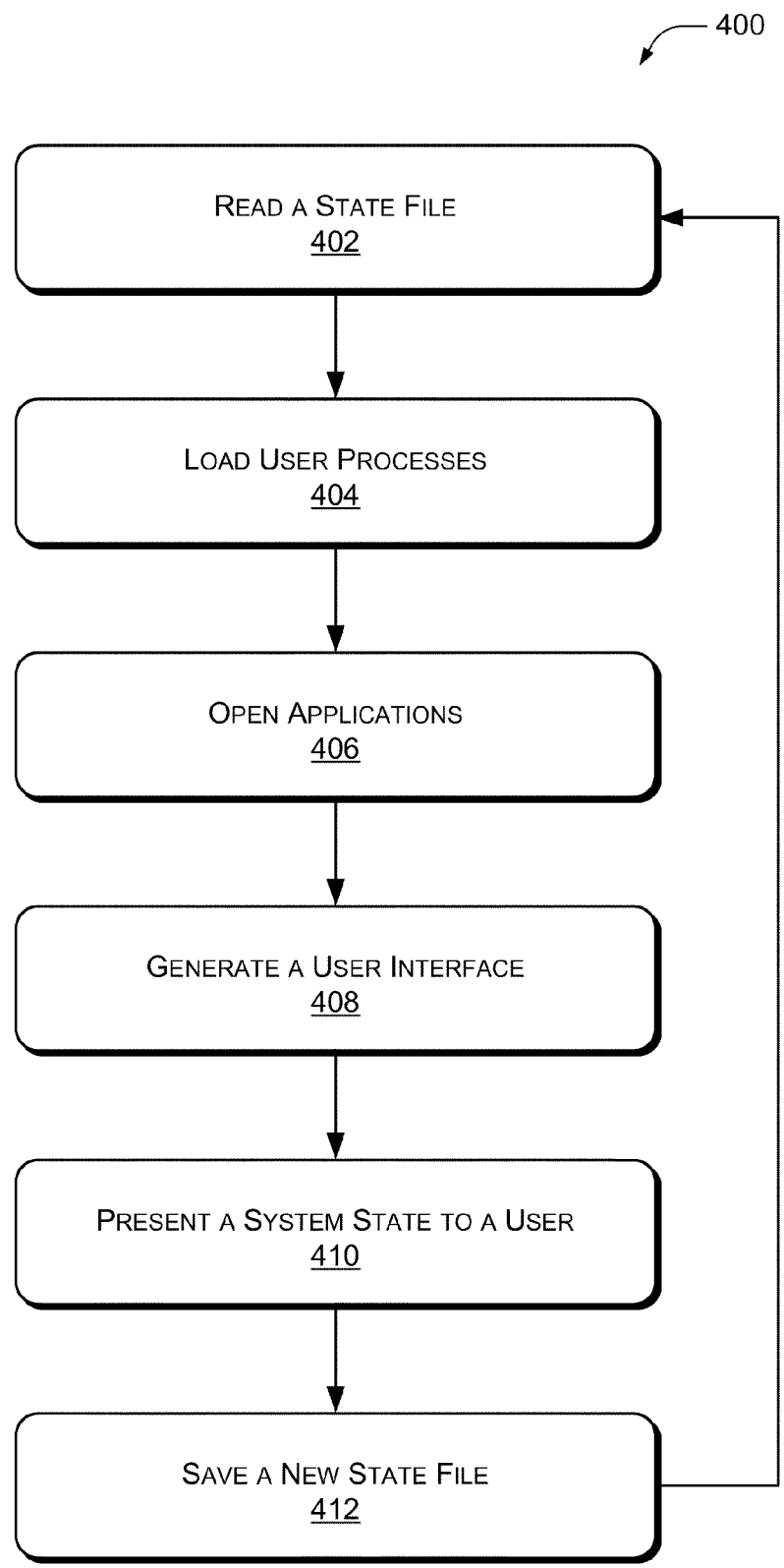
FIG. 4 is a flowchart showing an illustrative method of restoring a state from a state file.

FIG. 4 illustrates a flowchart of a process 400 of restoring a state from a state file. At block 402, a computing device loading a state file reads the state file. The state file may include information related to user processes, applications, and user-interface elements. Since the state file is a relatively small and light weight, the state file may be loaded from an e-mail attachment, a universal serial bus (USB) memory device, an optical disk, a smart media card, a memory of cellular phone (e.g., subscriber identity module (SIM) card), or the like.

At block 404, user processes are loaded into a memory coupled to a processor of the computing device or to a separate processor such as on a central server. For example, in a SRC implementation such as illustrated in FIG. 1, the memory of a thin client (e.g., a terminal 104) may maintain the user processes while the processor resources are supplied from a shared computing resource (e.g., computing device 102). In this implementation, the state could be saved and moved to a different computing device by simply reconnecting the terminal 104 (i.e., the state is saved in the memory of the terminal 104) to a different computing device (e.g., from computing device 102 to a different computing device).

At block 406, applications are opened. Since the application state is also preserved in the state file the system will return to exactly how the system looked when the user created the state file. Running applications will continue to hold their data structures, so a document will return to the same state, for example, with a cursor insertion point at the same point in the document as it was before. Since the application processes are saved in the state file as they were when in the computer memory, from the application's perspective, the application never exited or closed. Thus, the state file can be created any time even when the document itself cannot be saved, for example when a dialogue box is open. In instances in which the computing device loading the state file does not have an application that was available on the previous computing device, the corresponding document may not be loaded, a similar application may be opened instead (e.g., one web browser is substituted for another), or the portions of the application that were active in memory, and thus are included in the state file, are loaded and the application runs with a limited functionality provided by the portions that are included in the state file.

At block 408, a user interface comprising the user-interface elements is generated. As discussed above, the user-interface elements may include portions of a graphical user interface based around a window metaphor for organizing applications and documents. If the state file is loaded on a computing device with different display capabilities than the computing device that created the state file, the user interface may be adjusted accordingly such as by proportionally changing the size of the windows, minimizing windows other than the active window, adapting the resolution or the color pallet to match the current display capabilities, and the like.

At block 410, a system state is presented to the user. The system state includes the user processes, the applications, and the user-interface elements as each existed at a time of creating the state file. Once the system restores the system state the user can join into the state session and continue working into that session just as it was at the time the state file was created.

At block 412, a new state file is saved. The new state file includes user processes and user-interface elements active at a time of saving the new state file. In some implementations, the user may explicitly save the system state. In the same or different implementations, the system may passively auto-save the state to a state file periodically, for example every 30 seconds. In order to make the state files more compact, in some implementations only the differences between the current state and the previous state are stored. The differences, or the "deltas," of the state files can then be used to re-generate the state of the system as needed. The series of state files and the corresponding deltas creates a state stream 203. The user can view a series of metadata rich views of the state that may include thumbnails screens of the applications running when the state was preserved. This will allow the user to view a history of states on the machine and select the one he or she wishes to restore. In addition to the clock 310 shown in FIG. 3, the series of views and/or thumbnails screens provide another way other for the user to move throughout the state stream 203.

The new state file saved at block 412 may be reloaded on the same computing device at a later time or transferred to a different computing device and process 400 may repeat when the new state file is read at block 402.

Figure 5:
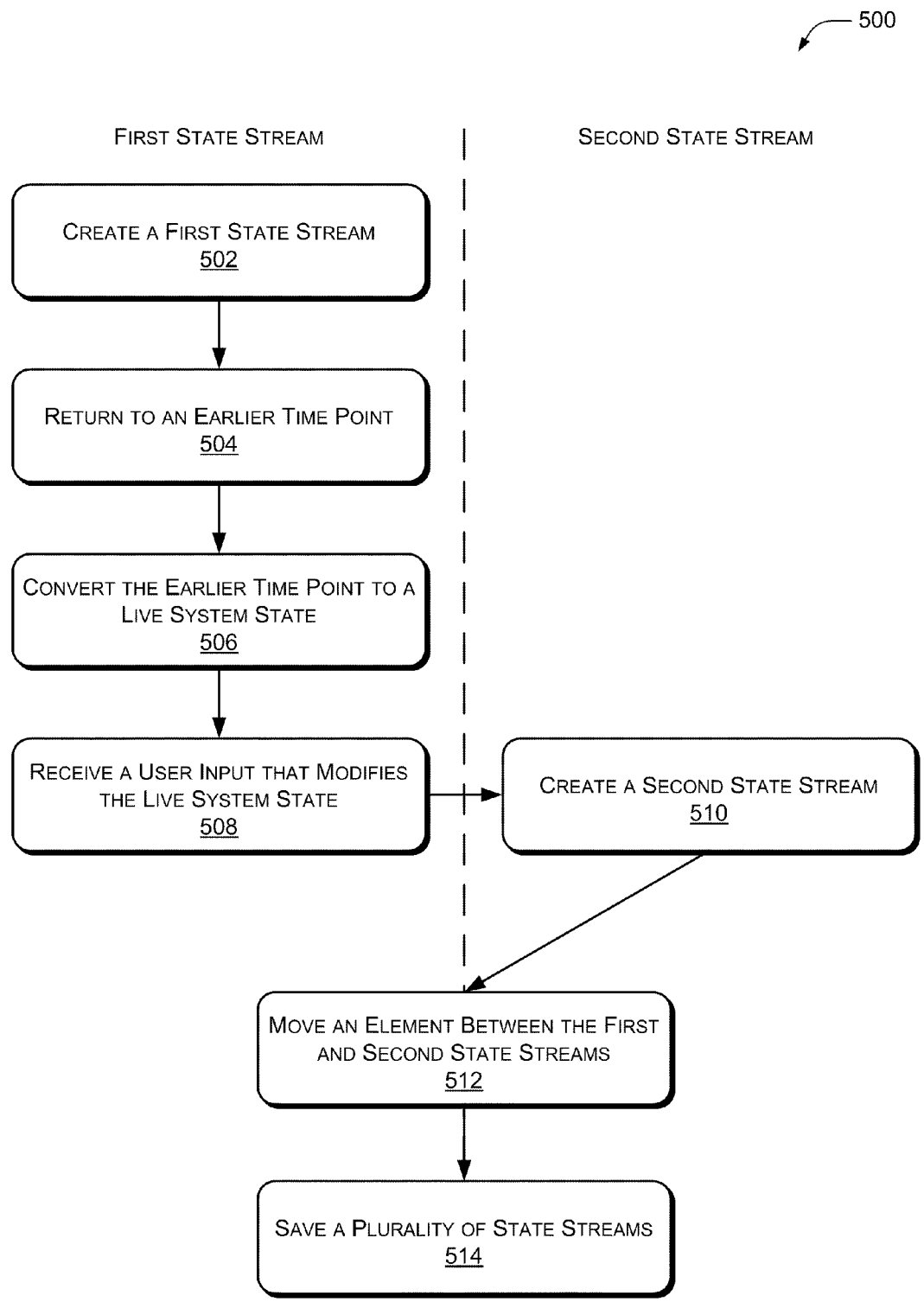
FIG. 5 is a flowchart showing an illustrative method of interacting with state streams.

FIG. 5 illustrates a flowchart of a process 500 for interacting with state streams. Any number of state streams may be created by repeated branching. For the simplicity of illustration, process 500 is shown involving only two state streams. However, it should be understood that the processes described herein is equally applicable to any number of state streams.

At block 502, a first state stream is created by repeatedly saving changes to a first state file. The state files from which the first state stream is created can be saved automatically or in response to an explicit user command as discussed above in relation to block 412 of process 400. The repeatedly saving changes to the first state file may include saving a difference ("delta") between the first state file at a first time point and the first state file at a second time point. In some implementations, the state file may comprise user processes and user-interface elements for a plurality of users. For example, during online collaboration or "white board" sessions the contributions and actions of many different users may be saved together in a single state file and/or state stream. The contributions of each user may be distinguished so that it is possible to know which changes were made by which user, and filter actions based on the contributor (e.g., contributions by one person may be filtered out to see what the state would have looked like without their contribution).

At block 504, the user returns to an earlier time point in the state stream. Returning to the earlier time point may be implemented upon receiving an indication from a user, such as an indication generated by the user designating the earlier time point via a graphical user-interface. In some implementations, a graphical user interface could be the graphical indicator 310 discussed in relation to FIG. 3, the series of metadata rich views discussed in relation to block 412 of process 400, or another graphical user-interface.

At block 506, the earlier time point in the state stream is converted to a live system state. As discussed above in regards to FIG. 3, a state stream may be viewed passively like a movie. This may be considered an inactive or non-live state. Conversion to a live system state may be done automatically or in response to a particular user input. Converting the earlier time point in the state stream to the live system state may include refreshing a device tree, refreshing a network connection, and/or the like. Some applications, such as e-mail or really simple syndication (RSS) feed viewers, may show stale or old data when the state stream is viewed in a passive state like a movie. For example, viewing a non-live state stream from 2 hours ago may not include any e-mail messages received in the last 2 hours. However, upon conversion to a live system state the e-mail application may synchronize with the e-mail server and download the e-mail messages received over the last 2 hours.

At block 508, a user input that modifies the live system state is received. This modification creates a fork in the state stream because the changes to the system state are different than they were in the original timeline. For example, returning to FIG. 3, editing the content of the document in the word processing application 316 will modify the system state shown in user interface 312.

At block 510, a second state stream is created by repeatedly saving changes to a second state file. The second state file may be created when the user input was received modifying the live system state and creating a fork or branch in the first state stream. As with block 502, the state files from which the second state stream is created can be saved automatically or in response to an explicit user command. The repeatedly saving changes to the first state file may include saving a difference ("delta") between the second state file at a first time point and the second state file at a second time point. From block 510, acts analogous to blocks 502-508 may be implemented to create a third state stream (not shown). A fourth, and additional, state streams may be created from forks in any of the existing streams (e.g., the first state stream, the second state stream, and/or the third state stream).

At block 512, an element is moved between the first state stream and the second state stream. Once multiple state streams exist it is possible to compare the streams, pick up changes over time, and copy and paste data between the streams. The element moved between the state streams may be an application, a file, or the like. Returning again to FIG. 3 as one illustrative representation, the word processing application 316 may be moved from the state stream represented by user interface 312 into the state stream represented by user interface 302. The word processing application 316 may replace the word processing 308 application or the two word processing 308 and 316 applications may coexist.

At block 514, a plurality of state streams including the first state stream and the second state stream are saved. In some implementations, the two streams could be completely merged and saved as a new state file. Each of the saved state streams may be viewed as a series of thumbnail images or other representations and the user may move throughout the state streams to different time points in the respective state streams. The state streams may also be illustrated in a map or tree view that shows starting points, branch points, ending points, the current point in time, and/or the like, to help the user visualize when/where the presently viewed state is relative to other states.

Illustrative Computing Device

FIG. 6 is a block diagram 600 showing an illustrative computing device 102. The computing device 102 may be configured as any suitable system capable of saving and/or loading state files 212 and state streams. The computing device 102 may comprise one or more processor(s) 108 and one or more memories 110. The processor(s) 108 may be implemented as appropriate in hardware, software, firmware, or combinations thereof. Software or firmware implementations of the processor(s) 108 may include computer- or machine-executable instructions written in any suitable programming language to perform the various functions described.

For example, the computing device 102 illustrates an architecture of these components residing on one system. Alternatively, these components may reside in multiple other locations, servers, or systems. Furthermore, two or more of the illustrated components may combine to form a single component at a single location.

Memory 110 may store programs of instructions that are loadable and executable on the processor(s) of 108, as well as data generated during the execution of these programs. Depending on the configuration and type of computing device 102, memory 110 may be volatile (such as RAM) and/or non-volatile (such as ROM, flash memory, etc.). The computing device 102 may also include additional removable storage and/or non-removable storage including, but not limited to, magnetic storage, optical disks, and/or tape storage. The disk drives and their associated computer-readable media may provide non-volatile storage of computer readable instructions, data structures, program modules, and other data.

Computer-readable storage media includes volatile and nonvolatile, removable and non-removable media implemented in any method or technology for storage of information such as computer-executable instructions, data structures, program modules or other data. Memory 110 is an examples of computer-readable storage media. Additional types of computer-readable storage media that may be present include, but are not limited to, tangible and non-transient media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the computing device 102.

Turning to the contents of the memory 110 in more detail, the memory 110 may be divided into partitions. The partitions may include an OS partition 602, a user partition 604, an unknown partition 606, as well as other partitions. Data related to an operating system 608 is preserved in a separate partition 602 from user data. For example, the state file 202 and other user data may be stored in a user partition 604. In some implementations, the user data for each user (e.g., users 106A-106N) may be stored in separate partitions. The separation may be implemented by a differencing disk, which allows writes to the memory 110 to be directed based on the state information, user information, and/or application instance. Creating separate partitions may achieve separation between the user state and the OS state. In some implementations, a disks filter may write the state file 212 to the user partition 604 or to a different computer-readable storage media other than the memory 110.

The unknown partition 606 may be designated to store data that is not categorized as either OS data or user data. For example, processes that are neither initiated by the user nor identified as OS processes could be categorized as unknown processes. Partitioning out the "unknown" data may help to reduce the file size of the state file 212 and enable relatively quicker loading of a saved system state. It may also prevent transfer of viruses or malicious applications when a state is saved and then reloaded. Most viruses and malicious applications will be categorized as unknown data and written to the unknown partition 606. Since data in the unknown partition 606 is not included in the state file 212 reloading a state from the state file 212 will not reload any viruses or malicious applications that might have been active when the state file was saved.

In some implementations, the components of computing device 102 that implement the creation of state files and state streams may function at a deep level within the computing device 102. For example, the process filter 112, the user-process filter 116, the user-interface recorder 118, the clock 120, the peripheral manager 124, and/or the file writer 126 may be components of the operating system (OS) 608, a hypervisor running in memory 110, and/or another deep-level software application.

The computing device 102 may also include input device(s) 610 such as a keyboard, mouse, pen, voice input device, touch input device, stylus, and the like, and output device(s) 612 such as a display, monitor, speakers, printer, etc. All these devices are well known in the art and need not be discussed at length. The input and output devices coupled to the computing device 106 in a SRC environment may include the terminals 104A-104N. The computing device 102 may also include other input or output devices which are not part of the terminals 104A-104N.

The computing device 102 may also contain a communication connection(s) 614 that allows the computing device 102 to communicate with other devices such as a network server. Communication connection(s) 614 is an example of a mechanism for receiving and sending communication media. Communication media typically embodies computer readable instructions, data structures, and program modules. By way of example, and not limitation, communication media includes wired media such as a wired network or direct-wired connection, and wireless media such as acoustic, RF, infrared and other wireless media.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations of controlling access to resources. For example, the methodological acts need not be performed in the order or combinations described herein, and may be performed in any combination of one or more acts.

The invention claimed is:

1. A system comprising:
one or more processors;
a memory coupled to the one or more processors;
a process filter stored in the memory and executable on the processor to separate operating system (OS) processes from user processes of a system state of a computing device;
a user-interface recorder stored in the memory and executable on the processor to record user-interface elements as perceived by a user;
a clock configured to correlate the user processes for a time point with the user-interface elements for the time point; and
a file writer configured to create a state file of a session of the computing device comprising data that corresponds to the user processes, the user-interface elements, and the time point, wherein the state file comprises a snapshot of the system state of the computing device and, in response to the state file being loaded or transferred, restores the system state to continue the user processes of the session, wherein the system state is associated with a user interface of the computing device displaying a plurality of different files, the plurality of different files being restored to an earlier time point together to provide a context that is absent from viewing earlier versions in isolation from one another such that the state file preserves the plurality of different files being displayed on the user interface as perceived by the user at the earlier time point.

2. The system of claim 1, wherein the process filter is configured to place a marker in the OS load chain indicating that processes loaded after the marker are user processes.

3. The system of claim 1, wherein the process filter comprises a filter driver.

4. The system of claim 1, wherein the user-interface elements comprise at least one of identity of windows, location of windows, or content displayed within a window.

5. The system of claim 1, further comprising a plurality of user terminals obtaining processor resources at least in part from the processor and obtaining memory resources at least in part from the memory.

6. The system of claim 1, further comprising a user-process filter configured to separate user processes of a first user from user processes of a second user.

7. The system of claim 6, wherein the filter writer is further configured to create separate state files for the first user and for the second user.

8. The system of claim 6, further comprising a peripheral manager configured to associate a peripheral device with the first user or with the second user.

9. A computer-implemented method comprising:
under control of one or more processors configured with executable instructions,
creating a first state stream by repeatedly saving changes to a first state file;
returning to an earlier time point in the first state stream;
converting the earlier time point in the first state stream to a live system state of a computing device;
receiving a user input that modifies the live system state of the computing device, wherein modification to the live system state of the computing device creates a fork in the first state stream by creating a second state stream from the first state stream by repeatedly saving changes to a second state file, the second state file created when the user input was received; and
in response to the fork being created, moving a file or application of the first state stream to the second state stream.

10. The computer-implemented method of claim 9, wherein the repeatedly saving changes to the first state file comprises saving a difference between the first state file at a first time point and the first state file at a second time point.

11. The computer-implemented method of claim 9, wherein the returning to an earlier time point is implemented upon receiving an indication from a user designating the earlier time point via a graphical user-interface.

12. The computer-implemented method of claim 9, wherein the state file comprises user processes and user-interface elements for a plurality of users.

13. The computer-implemented method of claim 9, wherein the converting the earlier time point in the state stream to the live system state comprises at least one of refreshing a device tree or refreshing a network connection.

14. The computer-implemented method of claim 9, wherein the application of the first state stream replaces or coexists with the application of the second state stream in response to the moving.

15. The computer-implemented method of claim 9, further comprising saving to memory a plurality of state streams including the first state stream and the second state stream.

16. One or more computer-readable storage device storing computer-executable instructions that, when executed by a processor, configure the processor to perform acts comprising:
    reading a state file at a computing device, the state file representing a system state of another computing device comprising user processes, applications, and user-interface elements, the state file being transferred from the other computing device to the computing device such that the system state is portable between different computing devices based at least in part on the state file;
    loading the user processes into memory coupled to the processor or a separate processor;
    opening the applications;
    generating, by using the processor, a user interface comprising the user-interface elements; and
    restoring the system state to a user at the computing device, the system state comprising the user processes, the applications, and the user-interface elements as each existed at a time the state file was created or last saved at the other computing device, wherein the restored system state allows the user to continue to work on one or more of the applications, wherein the user interface displays a plurality of different applications, the plurality of different applications being restored to an earlier time point together to provide context that is absent from viewing earlier versions in isolation from one another.

17. The one or more computer-readable storage device of claim 16, wherein the state file is hardware neutral.

18. The one or more computer-readable storage device of claim 16, wherein the computer-executable instructions further comprise an operating system (OS).

19. The one or more computer-readable storage device of claim 16, the acts further comprising:
    saving a new state file comprising user processes and user-interface elements active at a time of saving the new state file.

20. The one or more computer-readable storage device of claim 19, wherein the new state file is written by a disk filter to a user partition of the one or more computer-readable storage media or to a different computer-readable storage media.

* * * * *